(12) United States Patent
Subramanian et al.

(10) Patent No.: US 11,782,960 B1
(45) Date of Patent: Oct. 10, 2023

(54) MANAGEMENT OF CERTIFICATE METRICS

(71) Applicant: Amazon Technologies, Inc., Seattle, WA (US)

(72) Inventors: Manikandan Subramanian, Seattle, WA (US); Marcel Andrew Levy, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 398 days.

(21) Appl. No.: 17/110,684

(22) Filed: Dec. 3, 2020

(51) Int. Cl.
  *G06F 16/33* (2019.01)
  *G06F 16/2453* (2019.01)
  *G06F 16/27* (2019.01)
  *H04L 9/40* (2022.01)
  *G06F 3/06* (2006.01)

(52) U.S. Cl.
  CPC .............. *G06F 16/33* (2019.01); *G06F 3/061* (2013.01); *G06F 16/2453* (2019.01); *G06F 16/27* (2019.01); *H04L 63/105* (2013.01); *H04L 63/108* (2013.01)

(58) Field of Classification Search
  CPC ...... G06F 16/33; G06F 16/2453; G06F 16/27; G06F 3/061
  See application file for complete search history.

(56) References Cited

U.S. PATENT DOCUMENTS

| | | | |
|---|---|---|---|
| 10,250,587 B2 * | 4/2019 | Iwanir | H04L 63/0823 |
| 11,157,600 B2 * | 10/2021 | Brannon | G06F 11/3438 |
| 2018/0034646 A1 * | 2/2018 | Kuramoto | H04L 9/3268 |
| 2020/0074435 A1 * | 3/2020 | Baar | G06Q 20/3829 |
| 2021/0258172 A1 * | 8/2021 | Munoz Munoz | G06F 11/327 |

* cited by examiner

*Primary Examiner* — Dangelino N Gortayo
(74) *Attorney, Agent, or Firm* — Nicholson De Vos Webster & Elliott LLP

(57) ABSTRACT

Techniques for managing certificate metrics are described. A method of managing certificate metrics can include adding certificate data associated with one or more certificates to a plurality of slots of a metric certificate data store, reading, by a metric publisher, the certificate data associated with a first slot of the metric certificate data store in response to an event, determining a metric associated with each certificate associated with a subset of the certificate data associated with the first slot of the metric certificate data store, and providing the metric associated with each certificate to a resource monitoring service.

20 Claims, 9 Drawing Sheets

MANAGEMENT OF CERTIFICATE METRICS

BACKGROUND

Digital certificates are electronic identity documents which are used to prove ownership of a key. For example, a public key infrastructure (PKI) uses pairs of public and private keys to facilitate secure electronic communication. Public keys can be associated with digital certificates that certify the owner of a given public key. The digital certificates are created and signed by a public certificate authority which acts as a trusted third party. Various digital certificates can be used, e.g., to create secure connections over a network, such as the Internet. For example, Hypertext Transfer Protocol Secure (HTTPS) uses digital certificates to establish secure connections using Transport Layer Security (TLS)/Secure Sockets Layer (SSL).

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for certificate metric management. According to some embodiments, a certificate management service of a provider network manages certificates for use by customers with their resources. Every certificate is associated with various metrics that need to be regularly computed, such as expiry date. In traditional certificate management services, each certificate may be maintained in a centralized database which can be queried to calculate metrics for each managed certificate. However, as the number of certificates has increased, such direct querying of this database has led to increased read time which can negatively impact the performance of the database. For example, these metrics may need to be recomputed daily, or multiple times per day, leading to potentially millions of daily reads of the database in addition to the typical daily query traffic the database may experience.

Accordingly, in some embodiments, a certificate watch service is used to determine certificate metrics and provide the certificate metrics to a resource monitoring service to be provided to the certificate owners. The certificate watch service maintains a certificate metric data store which is logically partitioned into slots which represent temporal intervals (e.g., 5 min intervals). A metric publisher is configured to read each slot of the metric certificate data store during its corresponding temporal interval, determining one or more metrics for the certificate, and publishing those metrics to a resource monitoring service. The metric publisher then processes the next slot corresponding to the next temporal interval, and so on. Once all slots have been processed, the metrics for the certificates in the certificate data store have all been published, without requiring full reads of the certificate data store.

Figure 1:
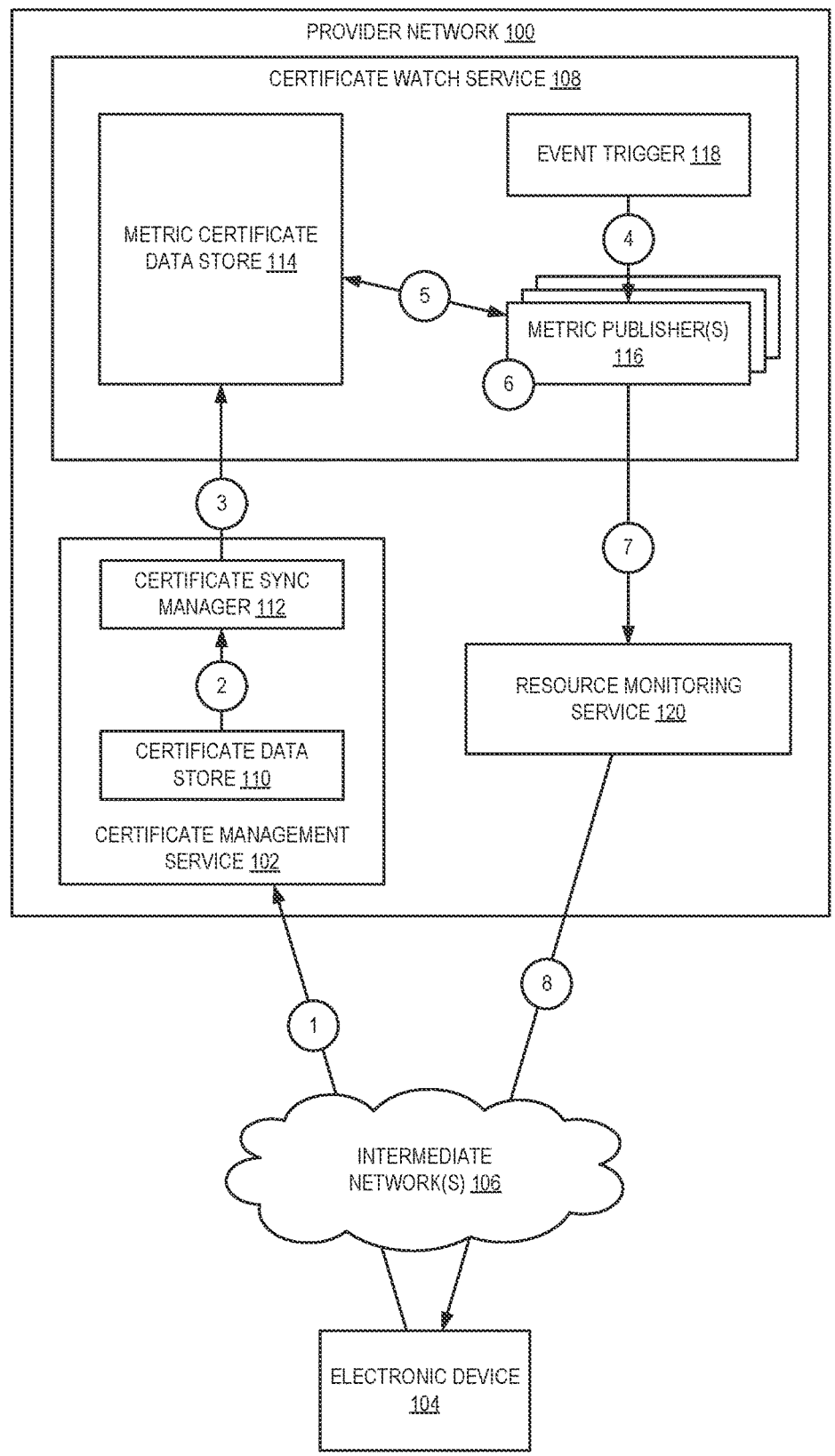
FIG. 1 is a diagram illustrating an environment for certificate metric management according to some embodiments.

FIG. 1 is a diagram illustrating an environment for certificate metric management according to some embodiments. As shown in FIG. 1, a provider network 100 includes a certificate management service 102, a certificate watch service 108, and a resource monitoring service 120. The certificate management service manages digital certificates on behalf of users of the provider network. In various embodiments, the digital certificates can include public or private certificates. As discussed, the certificate watch service can determine certificate metrics for the certificates managed by the certificate management service and then publish those metrics to resource monitoring service 120.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to AZ of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

To provide these and other computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code—typically without the user having any control of or knowledge of the underlying compute instance(s) involved.

In various embodiments, a "serverless" function may include code provided by a user or other entity—such as the provider network itself—that can be executed on demand Serverless functions may be maintained within provider network 100 by an on-demand code execution service (referred to in various embodiments as a function compute service, functions service, cloud functions service, functions as a service, or serverless computing service) and may be associated with a particular user or account or be generally accessible to multiple users/accounts. The on-demand code execution service can enable customers of the provider network 100 to execute their code on cloud resources without having to select or manage the underlying hardware resources used to execute the code. For example, a customer may be able to user the on-demand code execution service by uploading their code and using one or more APIs to request that the service identify, provision, and manage any resources required to run the code. A serverless function may be associated with a Uniform Resource Locator (URL), Uniform Resource Identifier (URI), or other reference, which may be used to invoke the serverless function. A serverless function may be executed by a compute resource, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

As shown in FIG. 1, a user using electronic device 104 can send a request to certificate management service 102 to enable certificate watch service 108 to manage one or more metrics for their digital certificates, at numeral 1. In various embodiments, the request is sent via an application programming interface (API) request, via a graphical user interface such as a console, or via other user interface. The request can indicate whether metric management is enabled or disabled and identify the certificates for which metric management is enabled or disabled. For example, the request may identify specific certificates, identify certificates based on usage (e.g., in use or not in use), or identify all certificates associated with the user's account. Additionally, the request can include information to configure notifications, such as reminders to perform particular actions based on the metrics being computed. For example, where a days to expiry metric is being computed, the request may indicate that a notification is to be sent to the user X days before expiry. Alternatively, at numeral 1, the user can make a change to an existing certificate, delete a certificate, or add a new certificate. If the user has already enrolled their certificates with the certificate watch service, then these changes can be identified so that they are kept in sync with the certificate watch service, as discussed further below.

As discussed, the certificate management service 102 can maintain a certificate data store 110. In some embodiments, the certificate data store 110 is a database that includes information about each certificate being managed (e.g., issue date, expiration date, validation information, etc.). Reads directly to the certificate data store 110 to compute metrics can add potentially millions of reads per day to the certificate data store, which can impact performance of the certificate data store and therefore impact performance of the certificate management service. As such, certificate watch service 108 maintains its own metric certificate data store 114. At numeral 2, once the metric management has been enabled for the user's certificates, the certificate sync manager 112 reads the corresponding certificates from the certificate data store. To ensure metric certificate data store 114 is kept up to date with the certificate data store 110, the certificate management service 102 includes a certificate sync manager 112. The certificate sync manager 112 can ensure that changes made to the certificate data store 110 are propagated to the metric certificate data store 114 in the certificate watch service. For example, in some embodiments, the certificate data store 110 may publish an event stream that indicates when certificates have been added to, or removed from, the certificate data store. The certificate sync manager 112 can include one or more listeners that read this event stream and then add or remove certificates from the metric certificate data store, accordingly.

At numeral 3, the certificate sync manager 112 adds the user's certificates to the metric certificate data store 114. As discussed, the metric certificate data store 114 is logically partitioned into a plurality of slots, where each slot is associated with a temporal interval. Each slot may hold up to a maximum number of certificates, depending on the length of the temporal interval. A metric publisher 116 is responsible for reading certificates from the metric certificate data store 114, computing a metric for those certificates, and publishing the computed metric to resource monitoring service 120. As shown, the certificate watch service 108 can include a plurality of metric publishers, each responsible for computing a different metric or for computing the same metric at staggered intervals. When an event trigger 118 is received, at numeral 4, the metric publisher 116 reads one slot of the metric certificate data store 114 including the plurality of certificates stored in that slot, at numeral 5. As discussed, the event trigger 118 can be a clock which provides a temporal trigger (e.g., indicating the start of a next temporal interval).

The metric publisher then computes a metric for each certificate read from that slot of the metric certificate data store 114, at numeral 6. For example, if the metric publisher 116 is computing days to expiry, then the metric publisher reads the expiration date for each certificate in that slot, determines a number of days until the expiration date, and then publishes the days to expiry metric. In some embodiments, the metric publisher 116 provides the computed metric to the resource monitoring service 120, as shown at numeral 7, as the metrics are computed. If there is an error when reading a particular certificate or computing its metric, the failure is limited to the slot where the certificate is stored. The slot can then be reread and reprocessed, without having to reprocess the entire data store. Alternatively, the metric publisher 116 can compute all of the metrics for the certificates read from the slot of the metric certificate data store 114 and then provide the resulting computed metrics in a batch to the resource monitoring service 104. When the next time interval starts, a new event trigger is sent to the metric publisher and it reads the next slot from the metric certificate data store, computes its metric, and provides the metric for the certificates from the next slot to the resource monitoring service. This process can continue at each time interval.

At numeral 8, the resource monitoring service 120 makes the metrics available to the user. A resource monitoring service 120 generally can be used to collect monitoring data, operational data, and other data in the form of logs, metrics, and events, or any other type of data related to various types of computing resources of a service provider network 100. In some embodiments, a resource monitoring service 120 can also collect data from external data sources, which can include data generated by any type of external computing resource or application. The metric data generally can include any type of data relating to certificates, operational data relating to various applications and systems, business data generated by various types of applications, and so forth. In some embodiments, the metric data is stored by a resource monitoring service 120. Alternatively, the metric data can be stored at any location accessible to the certificate watch service and resource monitoring service or streamed from another location.

In some embodiments, the resource monitoring service 120 can be further used to set alarms, to visualize logs and metrics, to take automated actions, etc. For example, the resource monitoring service 120 can send a notification to the user at numeral 8 indicating that the new metric is available.

Figure 2:
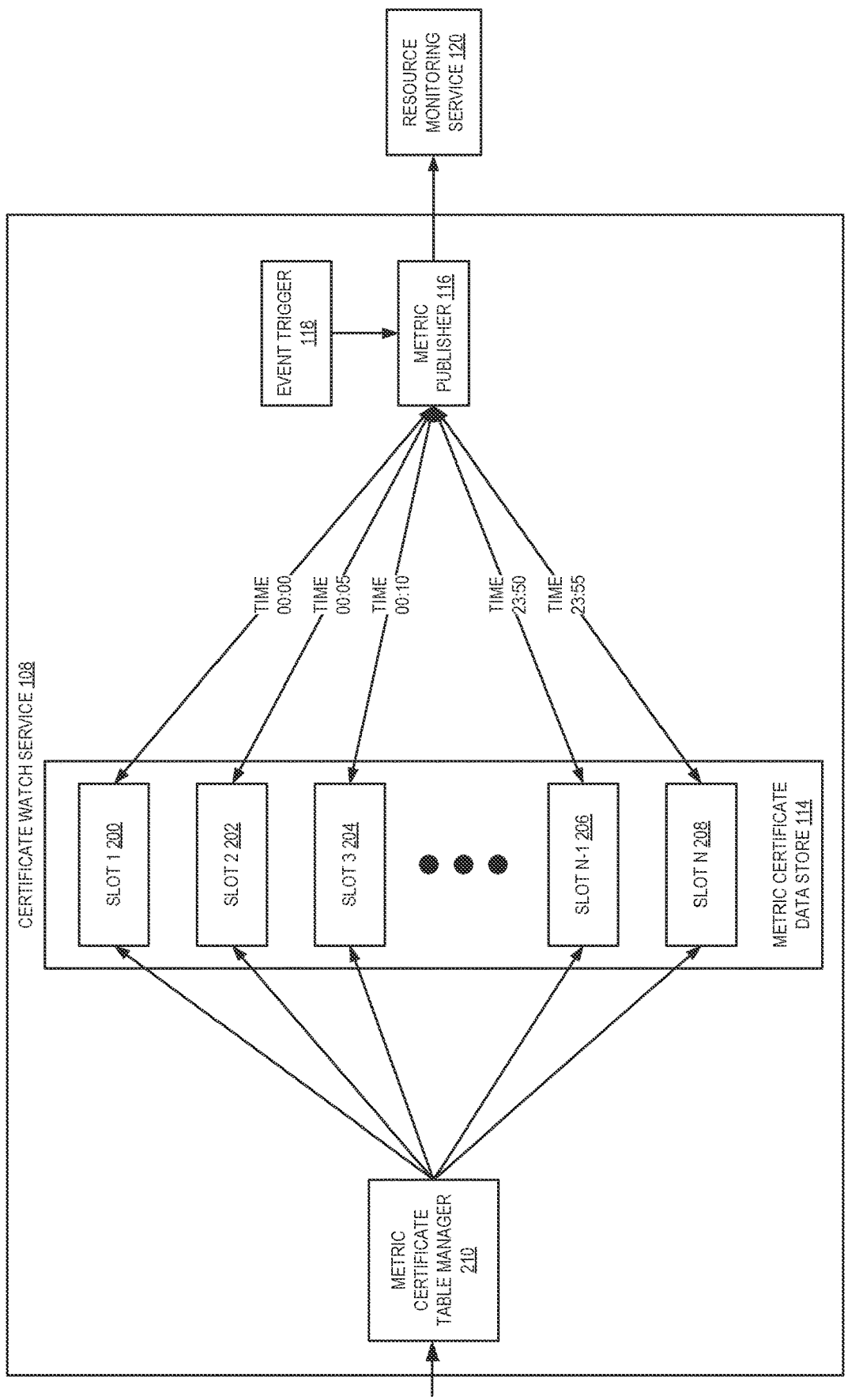
FIG. 2 is a diagram illustrating metric certificate table according to some embodiments.

FIG. 2 is a diagram illustrating metric certificate table according to some embodiments. As shown in FIG. 2, the metric certificate data store 114 can be logically partitioned into a plurality of slots (e.g., slot 1 200, slot 2 202, slot 3 204, . . . , slot N–1 206, and slot N 208). Each slot can hold a maximum number of certificates. In some embodiments, the maximum number of certificates is 30,000 certificates for a slot corresponding to a five-minute time interval. In some embodiments, the maximum number of certificates is a function of the time interval associated with each slot, the database implementation in use, and/or the resources available to the database. For example, if more bandwidth is available to read from the database more quickly, then the maximum number of certificates may be larger for a slot associated with a given time interval. Similarly, if the database implementation is capable of reading data more quickly, then the maximum number may be larger. Likewise, if fewer resources are available, or the database implementation in use is slower, then the maximum number of certificates for a slot associated with the same time interval may be smaller In some embodiments, although the maximum number of certificates each slot may hold may be the same, the actual number of certificates stored in those slots may vary. For example, certificates are added to the database using a consistent hashing algorithm. This may result in some slots having more certificates at a given point in time than some other slots, up to the maximum number of certificates. In some embodiments, different slots may be associated with different certificate maxima values.

As discussed, when a user enables the certificate watch service for their certificates managed by the certificate management service, or when changes are made to the certificates managed by the certificate management service, a change notification is received to update the metric certificate data store 114. In some embodiments, the change notification is received by a metric certificate table manager 210. The change notification can include the changes made to the certificate data store (e.g., the delta) or can include copies of the certificates being added to the certificate data store. The metric certificate table manager may be implemented as a serverless function which is triggered upon receipt of a notification. The metric certificate table manager 210 can implement a consistent hashing algorithm to determine which slot of the metric certificate data store 114 to add the certificate to.

Metric publisher 116 may be a sweeper which processed one slot of the metric certificate data store 114 at each time interval. As discussed, at the beginning of each time interval, an event trigger 118 is received by the metric publisher which causes it to read the slot associated with the current time interval. As shown in FIG. 2, at time 00:00, the metric publisher 116 reads slot 1 200 and processes the certificates stored therein to determine a metric associated with each of those certificates. The metric publisher 116 then provides the computed metrics to resource monitoring service 120. At time 00:05, the next interval begins, an event is received by the metric publisher, and it reads the certificates from slot 2 202, and so on for each time interval. In the example of FIG. 2, each slot is associated with a five-minute time interval. However, in various embodiments, the time interval associated with each slot may be longer or shorter than five minutes. In some embodiments, the metric publisher 116 is implemented as a serverless function that is triggered by the event trigger.

In some embodiments, the number of slots in the metric certificate data store 114 is equal to 288. As a result, each day every certificate is processed by the metric publisher 116 once, but without requiring the entire certificate data store 110 being read and computed at once. Instead, each certificate has its new metric value computed at the same time every day (e.g., corresponding to the time associated with the slot in which it is stored). If the number of certificates exceeds the maximum number of certificates that can be stored in the metric certificate data store, then a new metric certificate data store can be created which is similarly logically partitioned into slots. This new metric certificate data store is then processed by its own metric publisher. As such, embodiments can continue to scale as needed by adding additional metric certificate data stores and metric publishers.

Additionally, by organizing the metric certificate data store into a plurality of slots, the impact of failure conditions is reduced. For example, if there is an error when reading one or more certificates, then only the slot or slots to which those certificates belonged need to be reprocessed, and not the entire data store.

Figure 3:
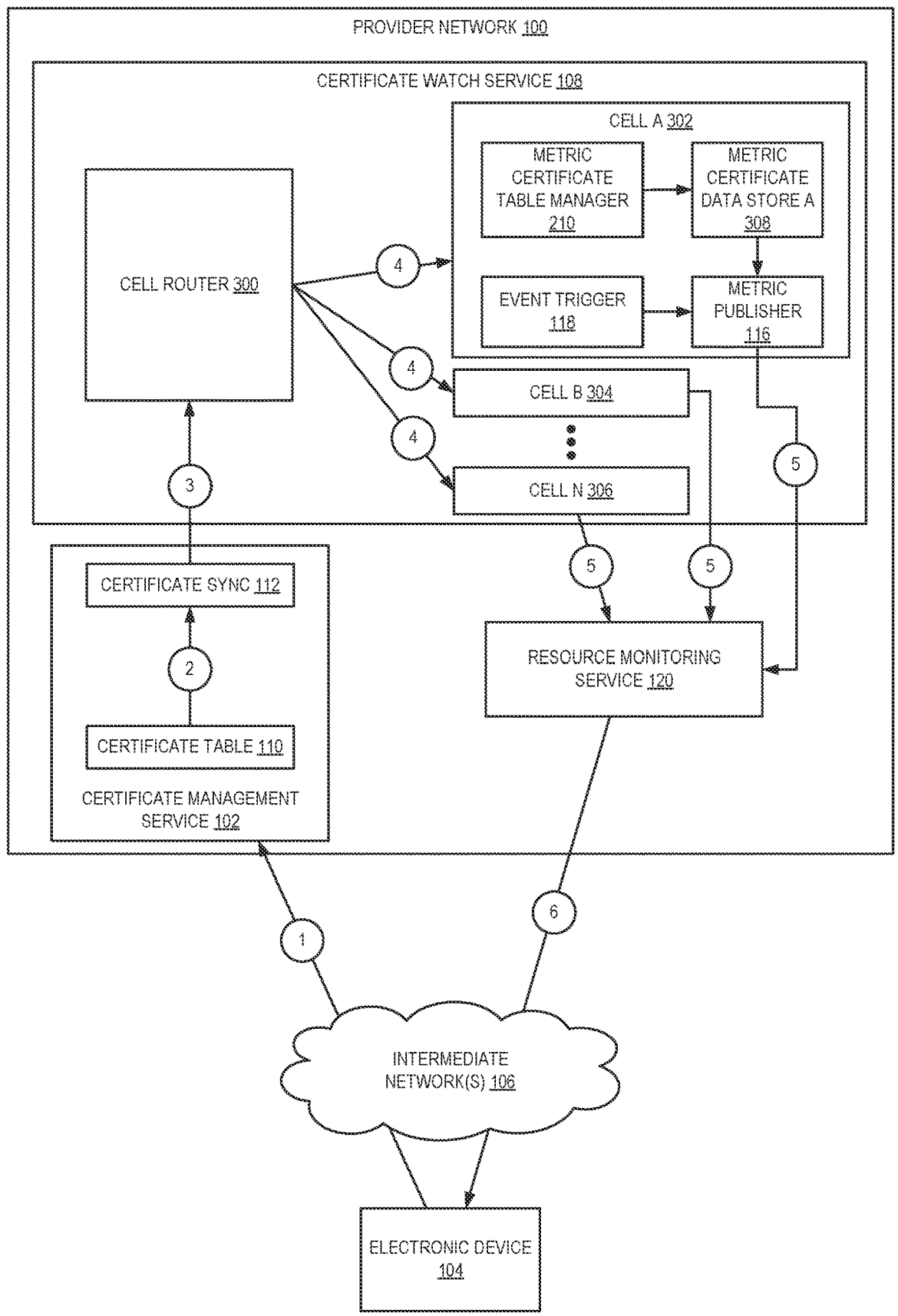
FIG. 3 is a diagram illustrating an environment for management of certificate metrics using multiple cells according to some embodiments.

FIG. 3 is a diagram illustrating an environment for management of certificate metrics using multiple cells according to some embodiments. Similarly to the example described above with respect to FIG. 1, in the example of FIG. 3, a user using electronic device 104 can send a request to certificate management service 102 to enable certificate watch service 108 to manage one or more metrics for their digital certificates, at numeral 1. At numeral 2, once the metric management has been enabled for the user's certificates, the certificate sync manager 112 reads the corresponding certificates from the certificate data store. To ensure metric certificate data store 114 is kept up to date with the certificate data store 110, the certificate management service 102 includes a certificate sync manager 112 which ensures that changes made to the certificate data store 110 are propagated to the certificate watch service.

At numeral 3, the certificate sync manager 112 provides any changes made to the certificate table and/or certificates which a user has just enabled certificate watch service to manage, to a cell router 300. Cell router 300 can propagate the certificates and/or changes to a plurality of cells (e.g., cell A 302, cell B 304, . . . , cell N 308). Each cell includes its own metric certificate table manager 210, metric certificate data store (e.g., metric certificate data store A 308 in cell A 302, metric certificate data store B in cell B, etc.), event trigger 118, and metric publisher 116. In some embodiments, each cell maintains a different portion of the certificates data store. In some embodiments, each cell includes a copy of the entire certificates data store and calculates a different metric for the certificates. As discussed, the metric publisher(s) in each cell read a slot from their corresponding metric certificate data store and computes a metric for those certificates stored in that slot. At numeral 5, the metric publisher of each cell provides the computed metrics to the resource monitoring service 120.

Figure 4:
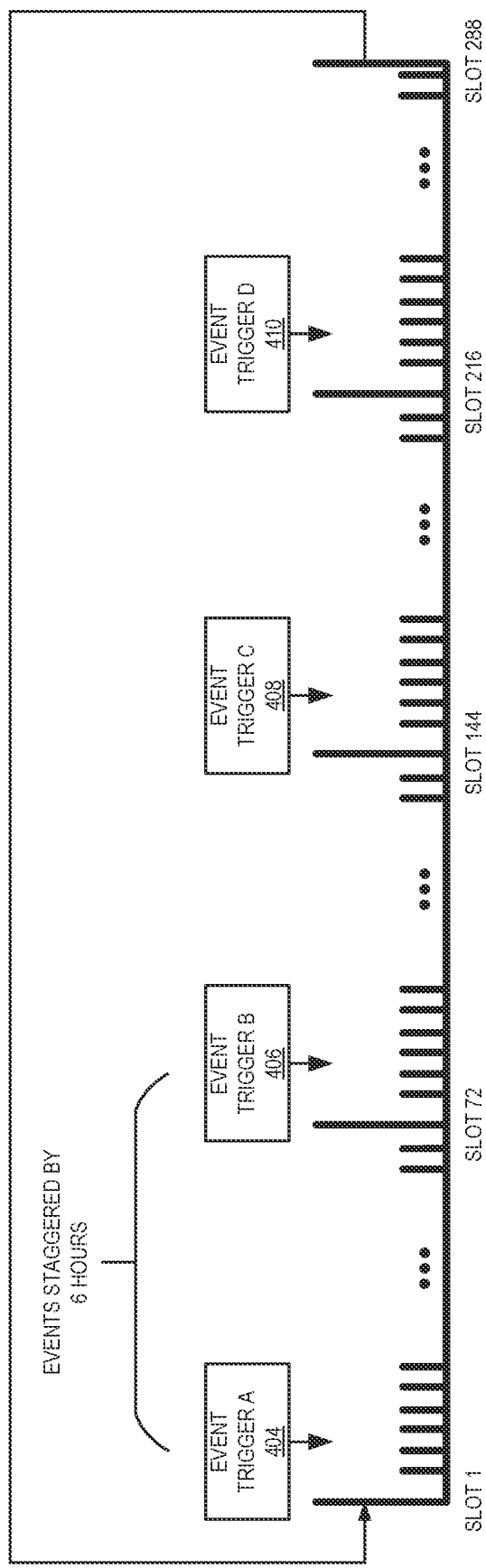
FIG. 4 is a diagram illustrating staggered certificate metric management according to some embodiments.

FIG. 4 is a diagram illustrating staggered certificate metric management according to some embodiments. As discussed, multiple metric publishers can be used to manage certificate metrics. In some embodiments, the metric publishers may each compute different metrics. Additionally, or alternatively, the metric publishers may compute the same metrics, but may be staggered as to when they process a particular slot. For example, in the case of the days to expiry metric, embodiments have been discussed with respect to computing this metric once per day. However, in some embodiments this, or other metrics, may need to be computed more frequently than that. As a result, multiple metric publishers can be staggered, such that the metric is computed multiple times per day.

In the example of FIG. 4, each slot is associated with a five-minute interval which results in 288 slots to cover an entire 24-hour period. If once daily metric updates are not frequent enough then additional event triggers (e.g., clocks) can be added accordingly. For example, four event triggers (e.g., event trigger A 404, event trigger B 406, event trigger C 408, and event trigger D 410) can be added and staggered such that the metric certificate table is updated four times per day. In this example, each event trigger is staggered by six hours, so each slot is computed every six hours and the results provided to the resource monitoring service.

Figure 5:
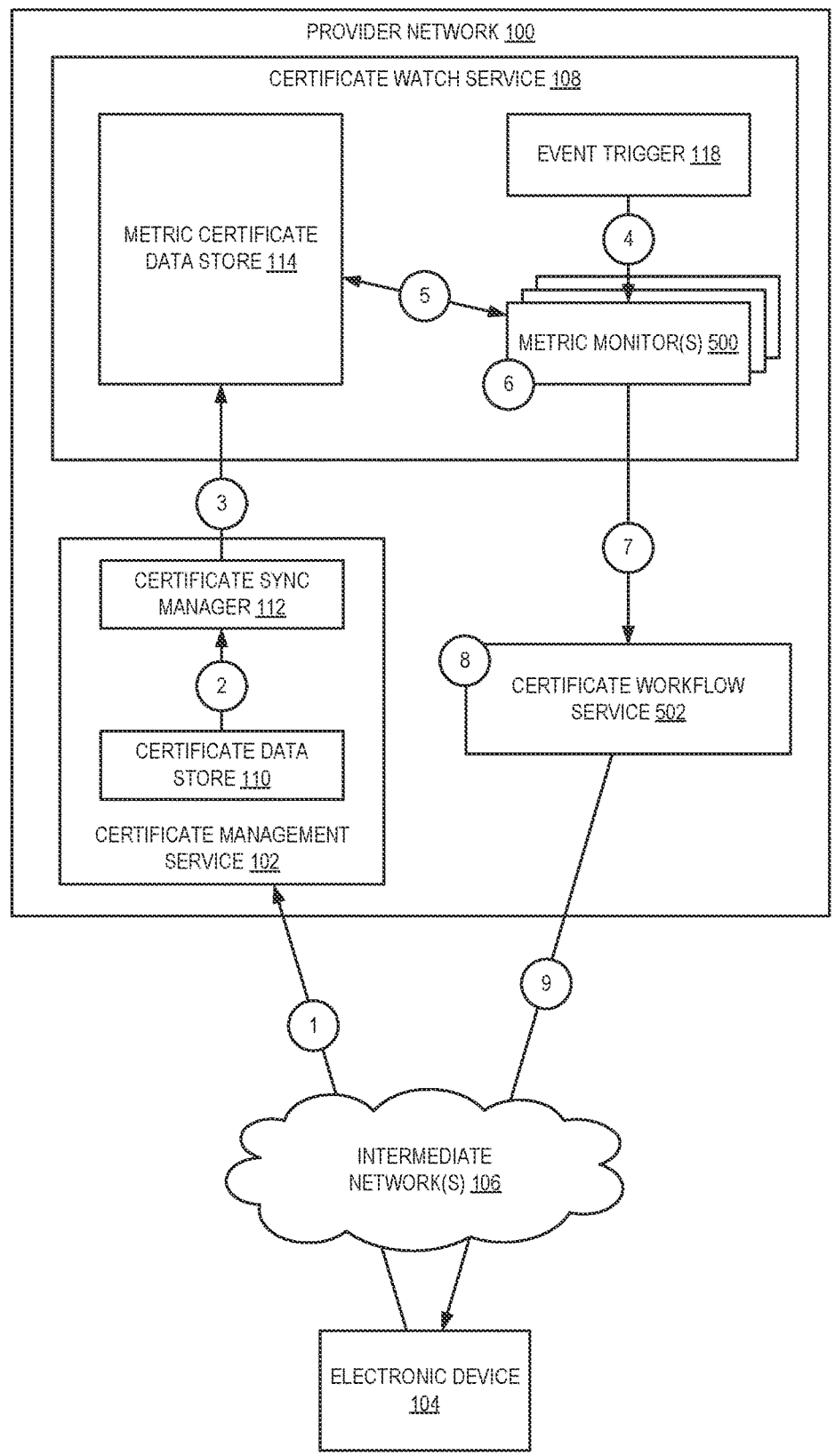
FIG. 5 is a diagram illustrating an environment for certificate metric management according to some embodiments.

FIG. 5 is a diagram illustrating an environment for certificate metric management according to some embodiments. Similarly to the example of FIG. 1, in FIG. 5 a user using electronic device 104 can send a request to certificate management service 102 to enable certificate watch service 108 to manage one or more metrics for their digital certificates, at numeral 1. As discussed, the certificate management service 102 can maintain a certificate data store 110 and the certificate watch service 108 can maintain its own metric certificate data store 114. At numeral 2, once the metric management has been enabled for the user's certificates, the certificate sync manager 112 reads the corresponding certificates from the certificate data store. To ensure metric certificate data store 114 is kept up to date with the certificate data store 110, the certificate management service 102 includes a certificate sync manager 112. The certificate sync manager 112 can ensure that changes made to the certificate data store 110 are propagated to the metric certificate data store 114 in the certificate watch service.

At numeral 3, the certificate sync manager 112 adds the user's certificates to the metric certificate data store 114. As discussed, the metric certificate data store 114 is logically partitioned into a plurality of slots, where each slot is associated with a temporal interval. Each slot may hold up to a maximum number of certificates, depending on the length of the temporal interval. A metric publisher 116 is responsible for reading certificates from the metric certificate data store 114, computing a metric for those certificates, and publishing the computed metric to resource monitoring service 120. As shown, the certificate watch service 108 can include a plurality of metric monitors 500, each responsible for computing a different metric, comparing the metric to a threshold value, and initiating a workflow based on the value of the metric relative to the threshold value. When an event trigger 118 is received, at numeral 4, the metric monitor 500 reads one slot of the metric certificate data store 114 including the plurality of certificates stored in that slot, at numeral 5. As discussed, the event trigger 118 can be a clock which provides a temporal trigger (e.g., indicating the start of a next temporal interval).

The metric monitor 500 then computes a metric for each certificate read from that slot of the metric certificate data store 114 and compares the computed metric to a threshold associated with that metric, at numeral 6. For example, if the metric monitor 500 is computing days to expiry, then the metric publisher reads the expiration date for each certificate in that slot, determines a number of days until the expiration date, and then compares the days to expiry value to a threshold value. In some embodiments, if the computed metric is less than the threshold value (or more than the threshold value, depending on the metric being computed), the metric monitor 500 can initiate a workflow hosted by certificate workflow service 502 related to that metric, as shown at numeral 7, as the metrics are computed.

At numeral 8, the certificate workflow service 503 can initiate the workflow associated with the metric. For example, if the days to expiry metric is less than a threshold value, then the certificate workflow service 502 can initiate a certificate renewal workflow. In some embodiments, the certificate workflow service 502 can be further used to initiate workflows to set alarms, to visualize logs and metrics, to take automated actions, etc. For example, the certificate workflow service 502 can send a notification to the user at numeral 9 indicating that the new metric is available. In some embodiments, the resource monitoring service can trigger a workflow related to the value of the metrics it is reporting.

Figure 6:
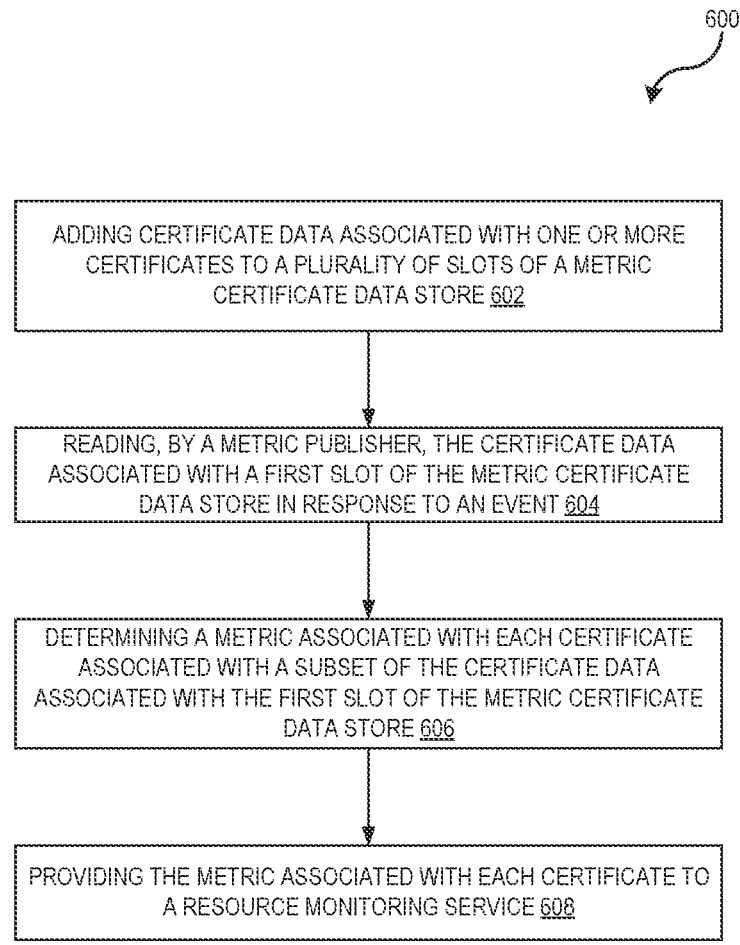
FIG. 6 is a flow diagram illustrating operations of a method for certificate metric management according to some embodiments.

FIG. 6 is a flow diagram illustrating operations 600 of a method for certificate metric management according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by the certificate management service 102 or certificate watch service 108 of the other figures.

The operations 600 include, at block 602, adding certificate data associated with one or more certificates to a plurality of slots of a metric certificate data store. As discussed, a certificate watch service can maintain a metric certificate data store which is logically partitioned into slots. The metric certificate data store can store certificate data (e.g., hostname, domain name, certificate authority, expiry date, etc.) which is obtained from a certificate management service. The certificate management service can manage certificates on behalf of customers and can maintain its own certificate data store. To reduce the number of times the certificate data store must be accessed to determine various certificate metrics, the certificate data can be synchronized with the metric certificate data store maintained by the certificate watch service.

The operations 600 further include, at block 604, reading, by a metric publisher, the certificate data associated with a first slot of the metric certificate data store in response to an event. As discussed, one or more event triggers, which may be implemented as clocks, can emit events at the start of each new time interval. These events are received by a metric publisher which responsively reads a slot associated with the current time interval and processes the certificates stored in that slot. Each event triggers the metric publisher to read a next slot from the metric certificate data store. In some embodiments, each slot of the plurality of slots of the metric certificate data store is associated with a daily time interval and wherein the metrics determined for a slot are provided to the resource monitoring service at a time each day corresponding to that slot's daily time interval. In some embodiments, each slot stores up to a maximum number of certificates, the maximum number of certificates based on a length of the daily time interval.

In some embodiments, the operations further include simultaneously to reading the certificate data associated with the first slot of the metric certificate data store, reading certificate data associated with a second slot of the metric certificate data store in response to a second event, the second slot offset from the first slot, determining a metric associated with each certificate associated with a subset of the certificate data associated with the second slot of the metric certificate data store, and providing the metric associated with each certificate of the second slot to the resource monitoring service.

The operations 600 further include, at block 606, determining a metric associated with each certificate associated with a subset of the certificate data associated with the first slot of the metric certificate data store. In some embodiments, the metric includes a time to expiry metric. In various embodiments, the metric may be calculated based on the certificate data read from the first slot of the metric certificate data store.

The operations 600 further include, at block 608, providing the metric associated with each certificate to a resource monitoring service. As discussed, the resource monitoring service can send a notification to the user, add the metric to a dashboard associated with the user, or otherwise make the metric data available to the user.

In some embodiments, the operations further include receiving a certificate data store change notification indicating that a certificate has been added to, or removed from, the certificate data store, and updating the metric certificate data store based on the certificate data store change notification. In some embodiments, the operations further include detecting a fail condition associated with reading the certificate data associated with the first slot of the metric certificate data store, and rereading the certificate data associated with the first slot of the metric certificate data store.

In some embodiments, the certificate data is read by a plurality of metric publishers, each metric publisher determining a different metric. In some embodiments, the certificate data is stored in a plurality of metric certificate data stores, and wherein each metric certificate data store is read by a different metric publisher.

In some embodiments, the operations include receiving a request to enable metric reporting for a plurality of certificates managed by a certificate management service, synchronizing certificate data associated with the plurality of certificates from a certificate datastore of the certificate management service to a metric certificate data store of a certificate watch service, wherein the certificate data is added to a plurality of slots of the metric certificate data store, each slot associated with a daily time interval, receiving, by a metric publisher of the certificate watch service, an event associated with a first daily time interval, reading, by the metric publisher, at least a subset of the certificate data from a first slot of the metric certificate data store, determining a time to expiry metric associated with each certificate from the subset of the certificate data associated with the first slot of the metric certificate data store, and providing the time to expiry metric associated with each certificate from the subset of the certificate data associated with the first slot of the metric certificate data store to a resource monitoring service.

In some embodiments, the operations further include receiving, by the metric publisher, a second event associated with a second daily time interval, reading, by the metric publisher, at least a second subset of the certificate data from a second slot of the metric certificate data store, determining the time to expiry metric associated with each certificate from the second subset of the certificate data associated with the second slot of the metric certificate data store, and providing the time to expiry metric associated with each certificate from the second subset of the certificate data associated with the second slot of the metric certificate data store to the resource monitoring service.

In some embodiments, the operations further include receiving, by a second metric publisher of the certificate watch service, the event associated with a first daily time interval, reading, by the second metric publisher, at least the subset of the certificate data from the first slot of the metric certificate data store in response to an event, determining a time to expiry metric associated with each certificate from the subset of the certificate data associated with the first slot of the metric certificate data store, and initiating a renewal workflow for each certificate whose time to expiry metric is less than or equal to a threshold value.

Figure 7:
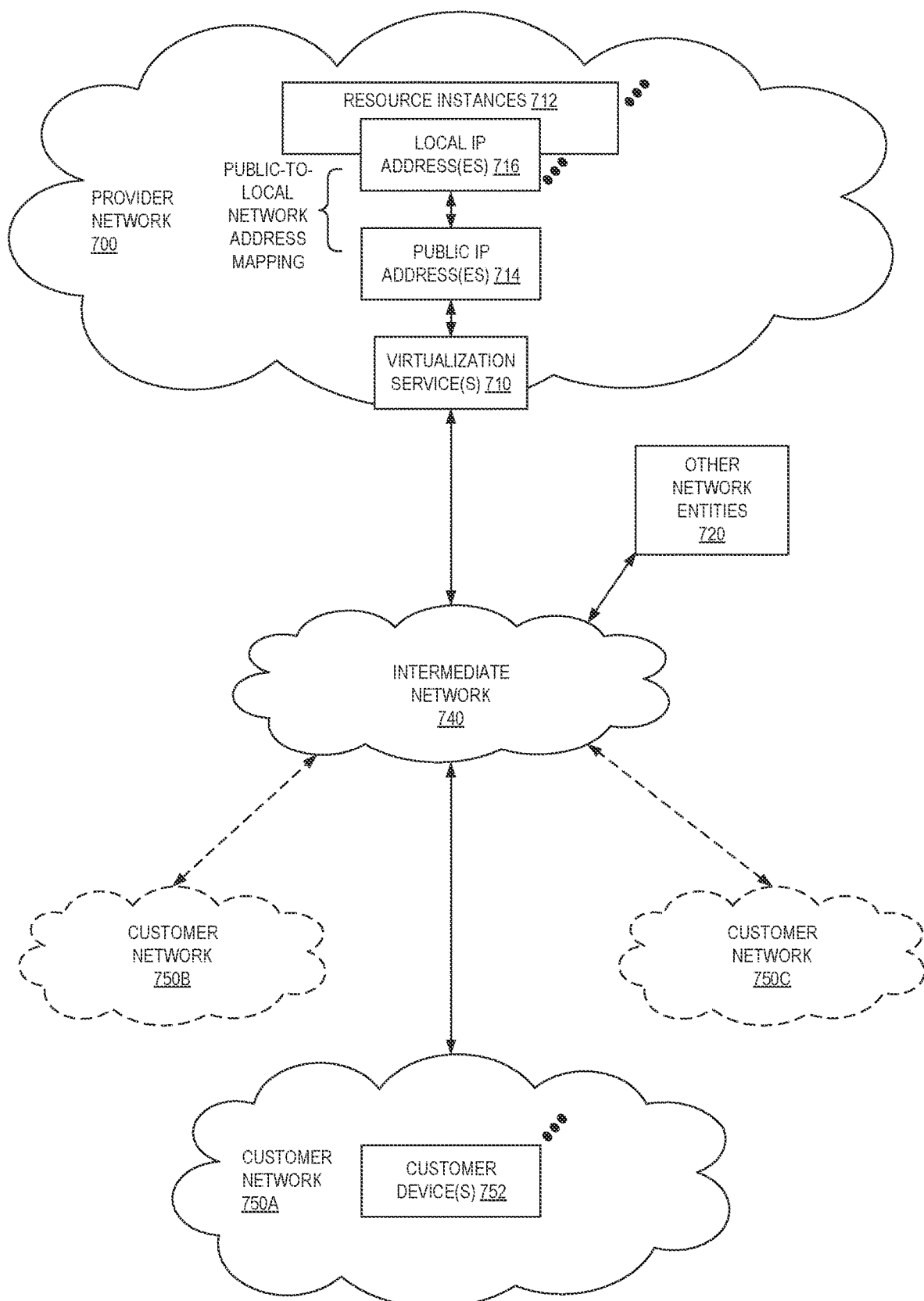
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 7 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
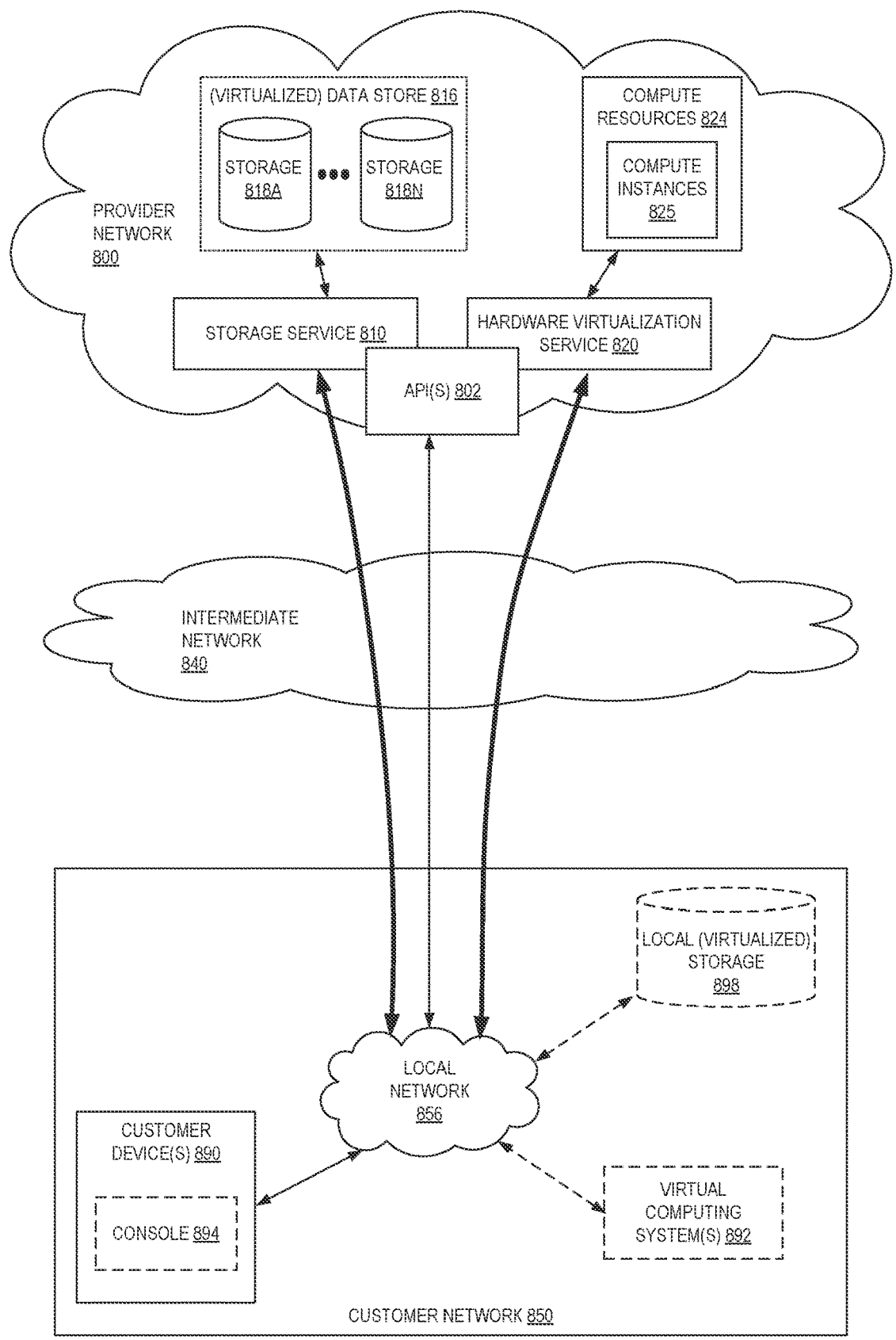
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple compute resources 824 (e.g., compute instances 825 such as VMs) to customers. The compute resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the compute resources 824 to public Internet destinations, and from public Internet sources to the local IP addresses of compute resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative Systems

Figure 9:
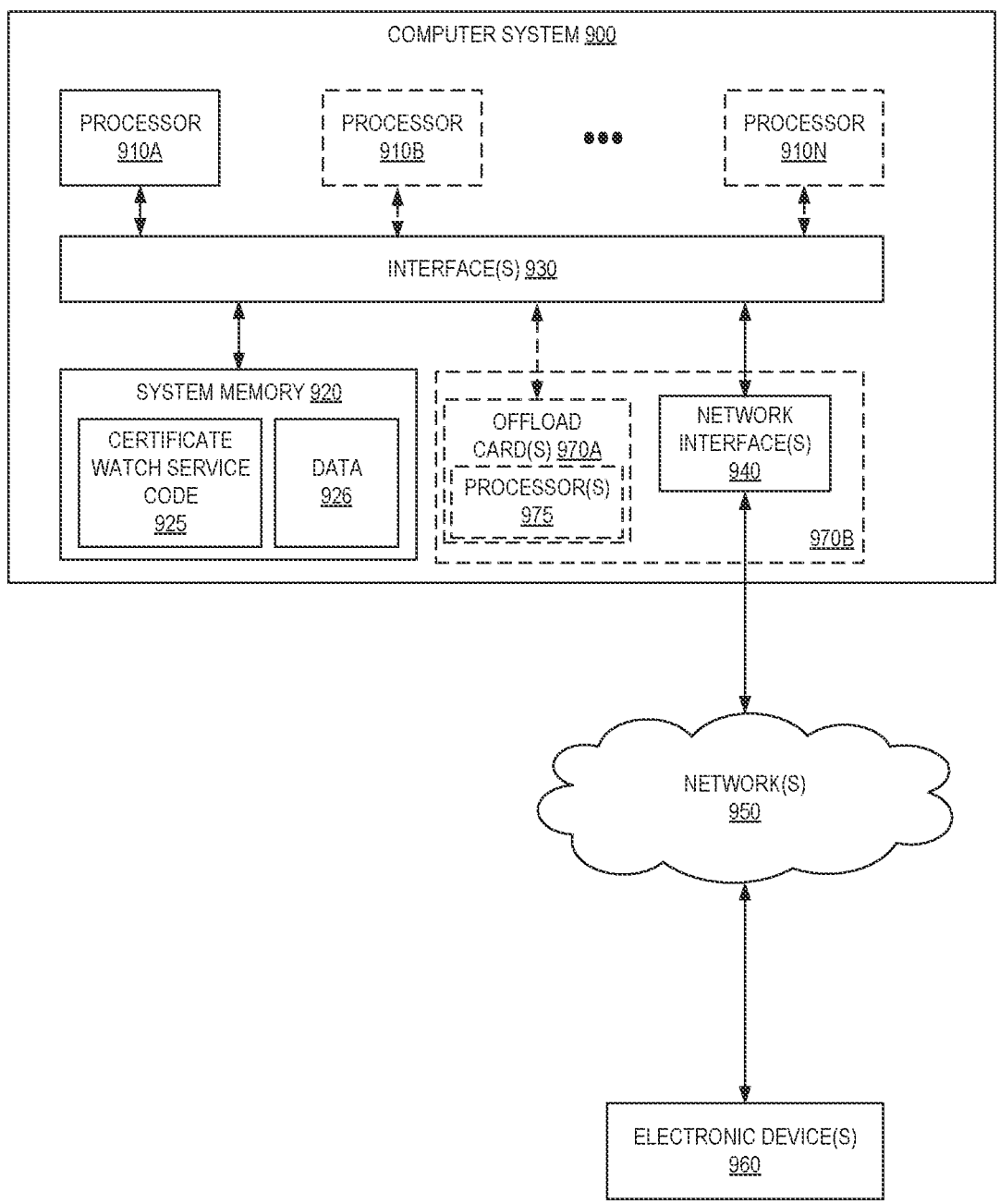
FIG. 9 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as certificate watch service code 925 (e.g., executable to implement, in whole or in part, the certificate watch service 108) and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970A or 970B (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute resources such as compute instances, and the one or more offload cards 970A or 970B execute a virtualization manager that can manage compute instances that execute on the host electronic device. As an example, in some embodiments the offload card(s) 970A or 970B can perform compute instance management operations such as pausing and/or un-pausing compute instances, launching and/or terminating compute instances, performing memory transfer/copying operations, etc. These management operations may, in some embodiments, be performed by the offload card(s) 970A or 970B in coordination with a hypervisor (e.g., upon a request from a hypervisor) that is executed by the other processors 910A-910N of the computer system 900. However, in some embodiments the virtualization manager implemented by the offload card(s) 970A or 970B can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C #or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method to improve database processing comprising:

receiving a request to enable metric reporting for a plurality of certificates managed by a certificate management service;

synchronizing certificate data associated with the plurality of certificates from a certificate datastore of the certificate management service to a metric certificate data store of a certificate watch service, wherein the certificate data is added to a plurality of slots of the metric certificate data store, each slot of the plurality of slots associated with one of a plurality of daily time intervals;

receiving, by a metric publisher of the certificate watch service, an event associated with a first daily time interval of the plurality of daily time intervals;

reading, by the metric publisher, at least a subset of the certificate data from a first slot of the plurality of slots of the metric certificate data store, wherein the first slot corresponds to the first daily time interval;

determining a time to expiry metric associated with each certificate from the subset of the certificate data; and providing the time to expiry metric associated with each certificate from the subset of the certificate data to a resource monitoring service.

2. The computer-implemented method of claim 1, further comprising:

receiving, by the metric publisher, a second event associated with a second daily time interval;

reading, by the metric publisher, at least a second subset of the certificate data from a second slot of the plurality of slots of the metric certificate data store, wherein the second slot corresponds to the second daily time interval;

determining the time to expiry metric associated with each certificate from the second subset of the certificate data; and providing the time to expiry metric associated with each certificate from the second subset of the certificate data to the resource monitoring service.

3. The computer-implemented method of claim 1, further comprising:
receiving, by a metric monitor of the certificate watch service, the event associated with the first daily time interval;
reading, by the metric monitor, at least the subset of the certificate data from the first slot of the plurality of slots of the metric certificate data store in response to receiving the event;
determining a time to expiry metric associated with each certificate from the subset of the certificate data; and
initiating a renewal workflow for each certificate from the subset of the certificate data whose time to expiry metric is less than or equal to a threshold value.

4. A computer-implemented method to improve database processing comprising:
adding certificate data associated with one or more certificates to a plurality of slots of a metric certificate data store, wherein each slot of the plurality of slots of the metric certificate data store is associated with one of a plurality of daily time intervals;
reading, by a metric publisher, the certificate data associated with a first slot of the plurality of slots of the metric certificate data store in response to an event associated with a first daily time interval of the plurality of daily time intervals, wherein the first slot corresponds to the first daily time interval;
determining a metric associated with each certificate associated with a subset of the certificate data associated with the first slot; and
providing the metric associated with each certificate associated with the subset of the certificate data to a resource monitoring service.

5. The computer-implemented method of claim 4, further comprising:
receiving a certificate data store change notification indicating that a certificate has been added to, or removed from, the certificate data store; and
updating the metric certificate data store based on the certificate data store change notification.

6. The computer-implemented method of claim 4, wherein metrics determined for a slot of the plurality of slots are provided to the resource monitoring service at a time each day corresponding to that slot's daily time interval.

7. The computer-implemented method of claim 6, wherein each slot of the plurality of slots stores up to a maximum number of certificates, and the maximum number of certificates is based on a length of the daily time intervals.

8. The computer-implemented method of claim 4, further comprising:
detecting a fail condition associated with reading the certificate data associated with the first slot; and
rereading the certificate data associated with the first slot.

9. The computer-implemented method of claim 4, further comprising:
simultaneously to reading the certificate data associated with the first slot, reading certificate data associated with a second slot of the plurality of slots of the metric certificate data store in response to a second event, the second slot offset from the first slot;
determining a metric associated with each certificate associated with a second subset of the certificate data associated with the second slot; and providing the metric associated with each certificate associated with a second subset of the certificate data to the resource monitoring service.

10. The computer-implemented method of claim 4, wherein the certificate data is read by a plurality of metric publishers, each metric publisher determining a different metric.

11. The computer-implemented method of claim 10, wherein the certificate data is stored in a plurality of metric certificate data stores, and wherein each metric certificate data store is read by a different one of the metric publishers.

12. The computer-implemented method of claim 4, wherein the metric includes a time to expiry metric.

13. A system comprising:
a first one or more electronic devices to implement a certificate management service in a multi-tenant provider network; and
a second one or more electronic devices to implement a certificate watch service in the multi-tenant provider network, the certificate watch service including instructions that upon execution by one or more processors cause the certificate watch service to:
add certificate data associated with one or more certificates to a plurality of slots of a metric certificate data store, wherein each slot of the plurality of slots of the metric certificate data store is associated with one of a plurality of daily time intervals;
read, by a metric publisher, the certificate data associated with a first slot of the plurality of slots of the metric certificate data store in response to an event associated with a first daily time interval of the plurality of daily time intervals, wherein the first slot corresponds to the first daily time interval;
determine a metric associated with each certificate associated with a subset of the certificate data associated with the first slot; and
provide the metric associated with each certificate associated with the subset of the certificate data to a resource monitoring service.

14. The system of claim 13, further comprising:
receiving a certificate data store change notification indicating that a certificate has been added to, or removed from, the certificate data store; and
updating the metric certificate data store based on the certificate data store change notification.

15. The system of claim 13, wherein metrics determined for a slot of the plurality of slots are provided to the resource monitoring service at a time each day corresponding to that slot's daily time interval.

16. The system of claim 15, wherein each slot of the plurality of slots stores up to a maximum number of certificates, and the maximum number of certificates is based on a length of the daily time intervals.

17. The system of claim 13, wherein the instructions, when executed by the one or more processors, further cause the certificate watch service to:
detect a fail condition associated with reading the certificate data associated with the first slot; and
reread the certificate data associated with the first slot.

18. The system of claim 13, wherein the instructions, when executed by the one or more processors, further cause the certificate watch service to:
simultaneously to reading the certificate data associated with the first slot, read certificate data associated with a second slot of the plurality of slots of the metric certificate data store in response to a second event, the second slot offset from the first slot;

determine a metric associated with each certificate associated with a second subset of the certificate data associated with the second slot; and provide the metric associated with each certificate associated with a second subset of the certificate data to the resource monitoring service.

19. The system of claim 13, wherein the certificate data is read by a plurality of metric publishers, each metric publisher determining a different metric.

20. The system of claim 19, wherein the certificate data is stored in a plurality of metric certificate data stores, and wherein each metric certificate data store is read by a different one of the metric publishers.

* * * * *